United States Patent [19]

Otsuka et al.

[11] 4,188,803
[45] Feb. 19, 1980

[54] CONSTANT VELOCITY UNIVERSAL JOINT

[75] Inventors: Nobuyuki Otsuka, Kawagoe; Seiichi Hirai, Sayama, both of Japan

[73] Assignee: Honda Giken Kogyo Kabushiki Kaisha, Tokyo, Japan

[21] Appl. No.: 951,604

[22] Filed: Oct. 13, 1978

[30] Foreign Application Priority Data

Dec. 16, 1977 [JP] Japan .................. 52-168321[U]
[52] U.S. Cl. .................................. 64/21; 64/7
[51] Int. Cl.² ............................................ F16D 3/30
[58] Field of Search ................................ 64/7, 21

[56] References Cited

U.S. PATENT DOCUMENTS

| | | | |
|---|---|---|---|
| 3,557,572 | 1/1971 | Auctor | 64/21 |
| 3,879,960 | 4/1975 | Welschof | 64/21 |
| 3,935,717 | 2/1976 | Welschof | 64/21 |
| 3,982,840 | 9/1976 | Grosseau | 64/7 |
| 4,020,648 | 5/1977 | Krude | 64/21 |
| 4,020,650 | 5/1977 | Krude | 64/21 |
| 4,083,201 | 4/1978 | Krude | 64/21 |
| 4,116,020 | 8/1978 | Auctor | 64/21 |

*Primary Examiner*—Ronald H. Lazarus
*Assistant Examiner*—R. C. Turner
*Attorney, Agent, or Firm*—Haseltine, Lake & Waters

[57] ABSTRACT

A constant velocity universal joint of the type having a ball cage with a plurality of balls interposed between an outer member and an inner member, the respective balls being in engagement with respective pairs of axially extending ball grooves in the mutually facing surfaces of the inner and outer members. The ball cage is so formed to be of double offset type having inner and outer spherical surfaces with eccentric center points. The spherical surfaces are in contact with respective spherical surfaces which are also eccentric in the inner and outer members. Additionally, the ball grooves are so formed that at their beginning at the free ends of the inner and outer members the grooves extend substantially rectilinearly and axially for one-half the length of the groove, and then extend along curved surfaces having a common center disposed between the eccentric center points.

4 Claims, 5 Drawing Figures

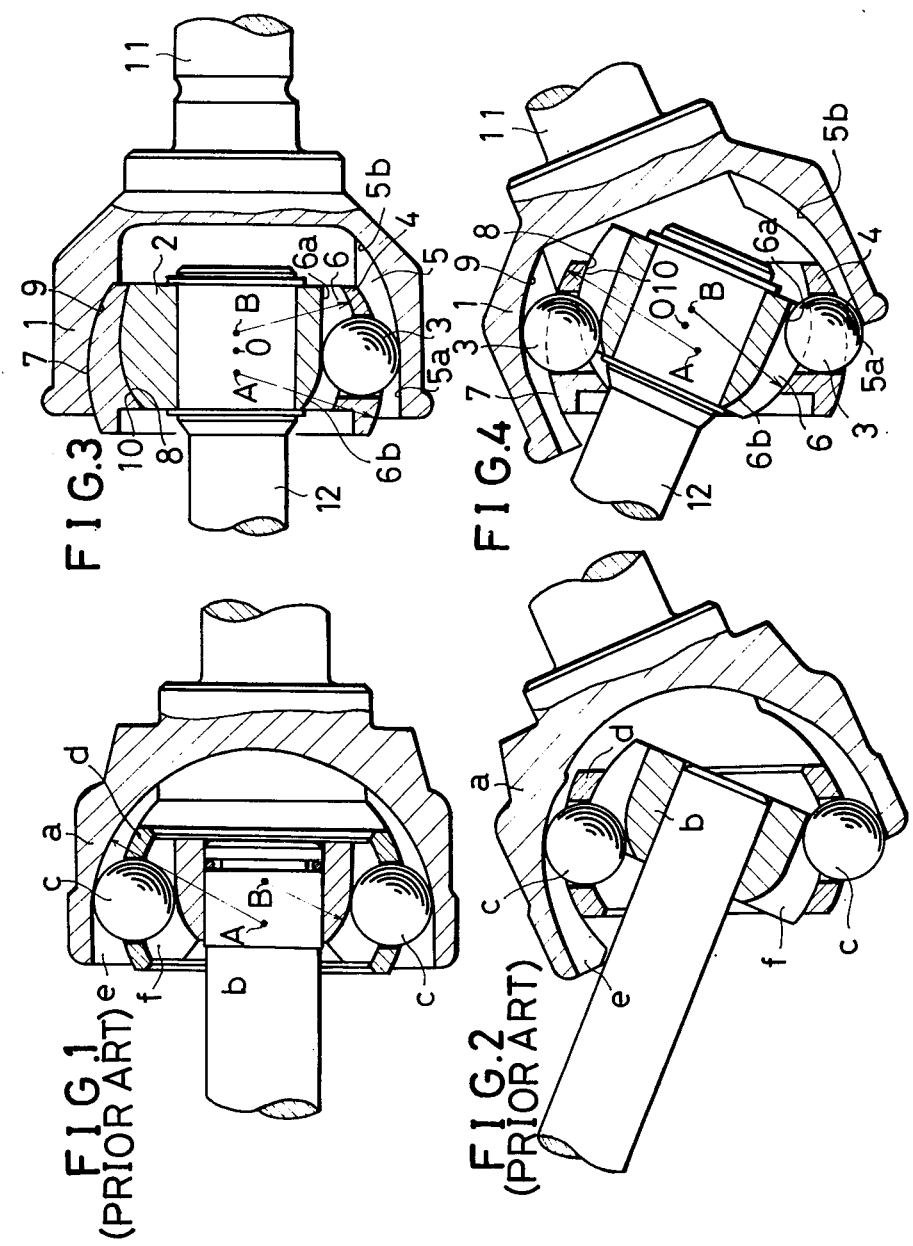

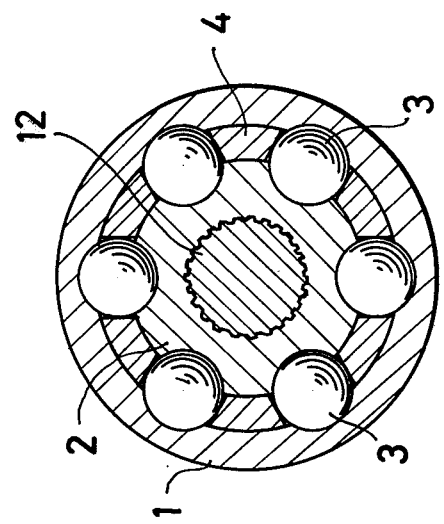

CONSTANT VELOCITY UNIVERSAL JOINT

FIELD OF THE INVENTION

This invention relates to a constant velocity universal joint applicable mainly to a vehicle such as a motorcar or the like.

PRIOR ART

In a known joint of this type as shown in FIGS. 1 and 2 a ball cage d having a plurality of balls c is interposed between an outer member a and an inner member b, and the respective balls c are in engagement with respective pairs of axially extending ball grooves e, f formed in the mutually facing surfaces of the two members a, b. In this case, the ball cage d has inner and outer spherical surfaces which are concentric with one another. The respective spherical surfaces are in contact with outer and inner spherical surfaces respectively formed in the inner and outer members and which are also concentric with one another. The joint further comprises means for providing a constant velocity property to these members by virtue of the instruction in which the respective ball grooves e, f are so formed that the respective bottom surfaces thereof extend substantially along an inner spherical surface of the outer member and an outer spherical surface of the inner member which have mutually eccentric center points A, B. In other words, the ball grooves e, f are so formed as to be of a double offset type. The above arrangement, however, has the disadvantage that the ball groove e, particularly, in the outer member a becomes gradually shallower with increasing penetration into the outer member, and thus when the two members a, b are inclined with respect to another, as shown in FIG. 2, the ball c is moved in the ball groove e toward the shallower side and is liable to come out of the groove.

Additionally, the ball c becomes interposed or wedged between the eccentric inner and outer spherical surfaces, and consequently is subjected to an outward pushing force whereby the ball c in a ball opening in the ball cage d is brought into pressure contact with the side edge surface of the opening and thus the ball is liable to become jammed or stuck.

SUMMARY OF THE INVENTION

An object of this invention is to provide a joint free from those disadvantages.

According to the invention there is provided a constant velocity universal joint which comprises inner and outer members having inter-engaged free ends and a ball cage with a plurality of balls interposed between the inner and outer members. The inner and outer members have respective inner and outer surfaces facing one another with axial grooves therein in which the balls are engaged. The inner and outer surfaces are of spherical shape with offset centers. The ball cage has inner surfaces of spherical shape in respective rocking engagement with the outer and inner surfaces of the inner and outer members. The grooves extend from the free end of the inner and outer surfaces axially and rectilinearly along about one-half the length of the grooves and then the grooves extend along a curved path for the remaining one-half of the length of the grooves. The curved path of the grooves have a common center disposed between the offset centers.

The curved paths are generally circular. Each groove has a substantially constant depth in the respective member. The distance between the bottom surfaces of the grooves in the inner and outer members is substantially constant.

BRIEF DESCRIPTION OF THE DRAWINGS

FIG. 1 is a sectional side view of a conventional embodiment of a constant velocity universal joint.

FIG. 2 is a sectional side view of the joint with the joint members in inclined relation.

FIG. 3 is a sectional side view of one embodiment of a joint according to this invention.

FIG. 4 is a sectional side view of the joint with the joint members in inclined relation.

FIG. 5 is a transverse sectional view of the joint.

DETAILED DESCRIPTION

The invention is directed to a constant velocity joint of the type in which a ball cage 4 having a plurality of balls 3 is interposed between an outer member 1 and an inner member 2, and the respective balls 3 are in engagement with respective pairs of axially extending ball grooves 5, 6 found in the mutually facing surfaces of the outer and inner members 1 and 2. The grooves are part-circular in transverse cross-section and rollably receive respective balls in conventional manner. The ball cage 4 is so formed as to be double offset type in which it has an outer spherical surface 7 and an inner spherical surface 8 which surfaces are eccentric and have mutually offset center points A, B. The surfaces 7 and 8 are in surface contact, respectively, with inner and outer surfaces 9 and 10, which are also eccentric, in the outer member 1 and the inner member 2. Additionally the ball grooves 5, 6 are so formed that they extend from the free ends of the inner and outer members rectilinearly and axially for one-half of the length of the grooves at 6a and 5a respectively and then they extend along circularly curved surfaces 6b and 5b for the remaining one-half of the groove length, the curved surfaces 5b and 6b having a common center O disposed between the two center points A,B. More specifically, the generatices of the grooves extend rectilinearly in portions 5a and 6a and along circularly curved paths in portions 5b and 6b.

The outer member 1 and the inner member 2 are secured to respective rotatable shafts 11, 12 extending outwardly therefrom, and in the case of a motorcar, for instance, the rotating shaft 11 may constitute a spindle for a front wheel and the rotating shaft 12 may constitute a driving shaft driven by the engine.

The operation of the joint is as follows:

If the two shafts 11, 12 are turned from the position in which they are aligned on the same axis as shown in FIG. 3 to the position in which they are inclined with respect to one another as shown in FIG. 4, the bend point thereof is the center point O, and the balls 3 are positioned on a bisector plane of the bend angle, that is, the action for providing the constant velocity property is effected mainly by the ball cage 4. More specifically, the ball cage 4 is of the offset type and is interposed between the outer member 1 and the inner member 2 as described before, and thus operates to position the balls 3 on the bisector plane, and thereby power transmission is effected through the balls 3.

According to this invention, the respective ball grooves 5, 6 comprise the substantially straight or rectilinear forward half-portions 5a, 6a extending in the axial direction and the respective half-portions 5b, 6b extending substantially circularly which have the common center point O, so that each groove has no great difference in depth throughout the entire length thereof. Consequently, removal of the balls 3 from the grooves 5, 6 during movement thereof can be prevented. Additionally, each ball 3 is only subjected to a slight force tending to push it out at the lower position in FIG. 2, so that the ball can be prevented from becoming stuck.

Thus, according to this invention, the double offset of the ball cage 4 is utilized instead of the conventional double offset of the ball grooves, so that the foregoing deficiencies in the conventional construction can be removed and the operation can become smooth and light, while additionally the ball grooves 5, 6 have no undercut, so that the forming operation thereof can be facilitated.

What is claimed is:

1. A constant velocity universal joint comprising inner and outer members having interengaged free ends, and a ball cage with a plurality of balls interposed between said inner and outer members, said inner and outer members having respective outer and inner surfaces facing one another, said outer and inner surfaces having axial grooves therein in which said balls are engaged, said inner and outer surfaces being of spherical shape with offset centers, said ball cage having inner and outer surfaces of spherical shape in respective rocking engagement with the outer and inner surfaces of the inner and outer members, said grooves extending from the free ends of the inner and outer members axially and rectilinearly along about one-half the length of the grooves and then extending along a curved path for the remaining one-half of the length of the grooves, the curved paths of the two grooves having a common center disposed between said offset centers.

2. A joint as claimed in claim 1 wherein said curved paths are circular.

3. A joint as claimed in claim 1 wherein each groove has a substantially constant depth in the respective member.

4. A joint as claimed in claim 3 wherein the distance between the bottom surfaces of the grooves in the inner and outer members is substantially constant.

* * * * *